(12) United States Patent
Kupietz et al.

(10) Patent No.: US 11,634,047 B2
(45) Date of Patent: Apr. 25, 2023

(54) SUSPENSION MAT FOR VEHICLE SEAT WITH GUIDING SUPPORT FOR ELECTRICAL CABLES

(71) Applicant: FAURECIA Sièges d'Automobile, Nanterre (FR)

(72) Inventors: Sascha Kupietz, Herford (DE); Didier Duriez, Le Plessis-Pâté (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/470,316

(22) Filed: Sep. 9, 2021

(65) Prior Publication Data
US 2022/0080860 A1    Mar. 17, 2022

(30) Foreign Application Priority Data

Sep. 10, 2020    (FR) ...................... 20 09156

(51) Int. Cl.
| | |
|---|---|
| *B60N 2/02* | (2006.01) |
| *B60N 2/90* | (2018.01) |
| *B60N 2/00* | (2006.01) |
| *B60N 2/12* | (2006.01) |
| *B60N 2/16* | (2006.01) |
| *B60N 2/20* | (2006.01) |
| *B60N 2/50* | (2006.01) |
| *B60N 2/56* | (2006.01) |
| *B60R 16/02* | (2006.01) |

(52) U.S. Cl.
CPC .......... *B60N 2/0224* (2013.01); *B60N 2/002* (2013.01); *B60N 2/12* (2013.01); *B60N 2/16* (2013.01); *B60N 2/20* (2013.01); *B60N 2/50* (2013.01); *B60N 2/5621* (2013.01); *B60N 2/5685* (2013.01); *B60N 2/976* (2018.02); *B60R 16/0207* (2013.01)

(58) Field of Classification Search
CPC ........ B60N 2/0224; B60N 2/002; B60N 2/12; B60N 2/16; B60N 2/20; B60N 2/50; B60N 2/976; B60N 2/5621; B60N 2/5685; B60N 2/7094; B60N 2/72; B60N 2002/0264; B60R 16/0207; B60R 16/0215
USPC .................................................. 297/180.12
See application file for complete search history.

(56) References Cited

U.S. PATENT DOCUMENTS

| | | | |
|---|---|---|---|
| 6,412,874 B1 | 7/2002 | Mayer | |
| 7,775,603 B2* | 8/2010 | Mundell | B60N 2/002 297/452.52 |
| 2003/0055364 A1* | 3/2003 | Knelsen | B60N 2/666 601/46 |
| 2008/0001464 A1* | 1/2008 | Mundell | B60N 2/7094 297/452.52 |
| 2011/0278886 A1* | 11/2011 | Nitsuma | B60N 2/888 297/216.13 |
| 2014/0367901 A1* | 12/2014 | Matejko-Anger | B60N 2/7094 248/65 |

FOREIGN PATENT DOCUMENTS

EP    2851239 A1    3/2015

\* cited by examiner

*Primary Examiner* — Mark R Wendell
(74) *Attorney, Agent, or Firm* — Barnes & Thornburg LLP (57) ABSTRACT

A suspension mat for a vehicle seat comprises a spring element, and a guiding support for at least one electrical cable. The guiding support is molded onto the spring element.

19 Claims, 8 Drawing Sheets

SUSPENSION MAT FOR VEHICLE SEAT WITH GUIDING SUPPORT FOR ELECTRICAL CABLES

PRIORITY CLAIM

This application claims priority to French Patent Application FR 20 09156, filed Sep. 10, 2020, which is expressly incorporated by reference herein.

BACKGROUND

The present disclosure relates to a suspension mat for a vehicle seat, in particular for a motor vehicle seat. This disclosure also relates to a vehicle seat comprising such a suspension mat.

SUMMARY

According to the present disclosure, a suspension mat for a vehicle seat comprises a spring element and a guiding support for at least one electrical cable.

In illustrative embodiments, the guiding support is molded onto the spring element.

In illustrative embodiments, the guiding support makes it possible to guide the electrical cable or cables in the seating portion, thus limiting the footprint of this or these electrical cables.

In illustrative embodiments, the suspension mat comprises one or more of the following features, alone or in combination:

the guiding support comprises at least one groove suitable for receiving at least one electrical cable, preferably inserted in the at least one groove;

the guiding support comprises at least one receiving housing for an electrical connector, at one end of the at least one groove, where appropriate;

a receiving housing for an electrical connector is at each end of the at least one groove;

the suspension mat further comprises at least one electrical cable received in the guiding support;

the at least one electrical cable comprises at least one electrical connector received in the receiving housing;

the at least one electrical cable comprises at least one ribbon cable, in particular at least one flexible printed circuit;

the at least one electrical cable comprises at least one electrical wire, preferably encased in sheathing;

the guiding support extends, preferably solely, along edges of a planar central portion of the spring element;

the spring element comprises at least one spring, each spring being formed by a bent metal wire, each spring preferably comprising an attachment hook molded onto at least one end, preferably onto each end of the metal wire;

the guiding support is created integrally with retaining elements of the spring(s) of the spring element; and the guiding support forms at least one receiving housing for at least one spring, the at least one receiving housing preferably being on a face of the guiding support, opposite the groove, where appropriate.

In illustrative embodiments, a vehicle seat is described comprising a seating portion with a seating portion frame and a suspension mat as described above in any of its combinations that is fixed to the seating portion frame.

In illustrative embodiments, the vehicle seat may further comprise at least one actuator among:

an actuator for adjusting a longitudinal position of the seat on a guide rail;

an actuator for adjusting the tilt of a backrest of the seat relative to the seating portion or of an upper backrest relative to a lower part of the backrest;

an actuator for adjusting the position of a seat belt guide of a seat belt system;

an actuator for adjusting the relative position of a headrest in relation to a backrest of the vehicle seat;

an actuator for adjusting a longitudinal position of a front part of the seating portion of the seat relative to a rear part of the seating portion of the seat;

an actuator for adjusting a height of the seating portion of the seat;

an actuator for adjusting a tilt of the seating portion, for example relative to a support of the vehicle seat;

an actuator for adjusting a position of a leg support relative to the seating portion of the seat;

an actuator for adjusting a position of a or of each armrest of the vehicle seat;

an actuator for adjusting an elongation of a or of each armrest of the seat;

an actuator for adjusting a pivoting of the seat about a substantially vertical axis, within a range of 40°, preferably within a range of 30°, more preferably within a range of 20°;

an actuator for adjusting a pivoting of the vehicle seat about a substantially vertical axis, within a range of one rotation, preferably half a rotation;

an actuator for adjusting a position of a footrest for an occupant of another vehicle seat;

an actuator for massaging an occupant of the vehicle seat;

a fan, in particular in the seating portion and/or in a backrest of the vehicle seat;

a heating element, in particular a resistive heater; and at least one vibrating element, in particular at least one vibrating element intended to warn an occupant of the seat in the event of a safety alert, and/or at least one sensor among:

a presence sensor for detecting an occupant of the seat;

a temperature sensor;

a humidity sensor;

a perspiration sensor for an occupant of the seat;

an accelerometer;

a sensor for detecting information relating to a morphology of an occupant of the vehicle seat;

a seat belt buckling sensor;

the at least one actuator and/or sensor being electrically connected to the at least one electrical cable.

In illustrative embodiments, a method is described for manufacturing a suspension mat for a vehicle seat, as described above in any of its combinations, comprising the steps of:

providing a spring element intended for supporting a seat cushion; and molding the guiding support onto the spring element.

In illustrative embodiments, the method may further comprise molding retaining elements onto the springs of the spring element.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements. For brevity, only those elements which are useful to understanding the embodiment described are shown in the figures and described in detail below.

In the following description, when reference is made to absolute position qualifiers, such as the terms "front", "rear", "top", "bottom", "left", "right", etc., or relative qualifiers, such as the terms "above", "below", "upper", "lower", etc., or to orientation qualifiers, such as "horizontal", "vertical", etc., unless otherwise specified these are in reference to the orientation of the figures or of a vehicle seat in its normal position of use.

In particular, the longitudinal direction X refers to the longitudinal direction of the seat. The longitudinal direction of the seat is considered to be the same as the longitudinal direction of the motor vehicle in which the seat is mounted. This longitudinal direction X corresponds to the normal direction of travel of the vehicle. The longitudinal direction X is horizontal. The transverse direction Y of the seat thus corresponds to the transverse or lateral direction of the motor vehicle. This transverse direction corresponds to a direction perpendicular to the normal direction of travel of the vehicle. The transverse direction Y is horizontal. Lastly, the vertical direction Z is a vertical direction of the seat, perpendicular to the longitudinal and transverse directions.

Figure 1:
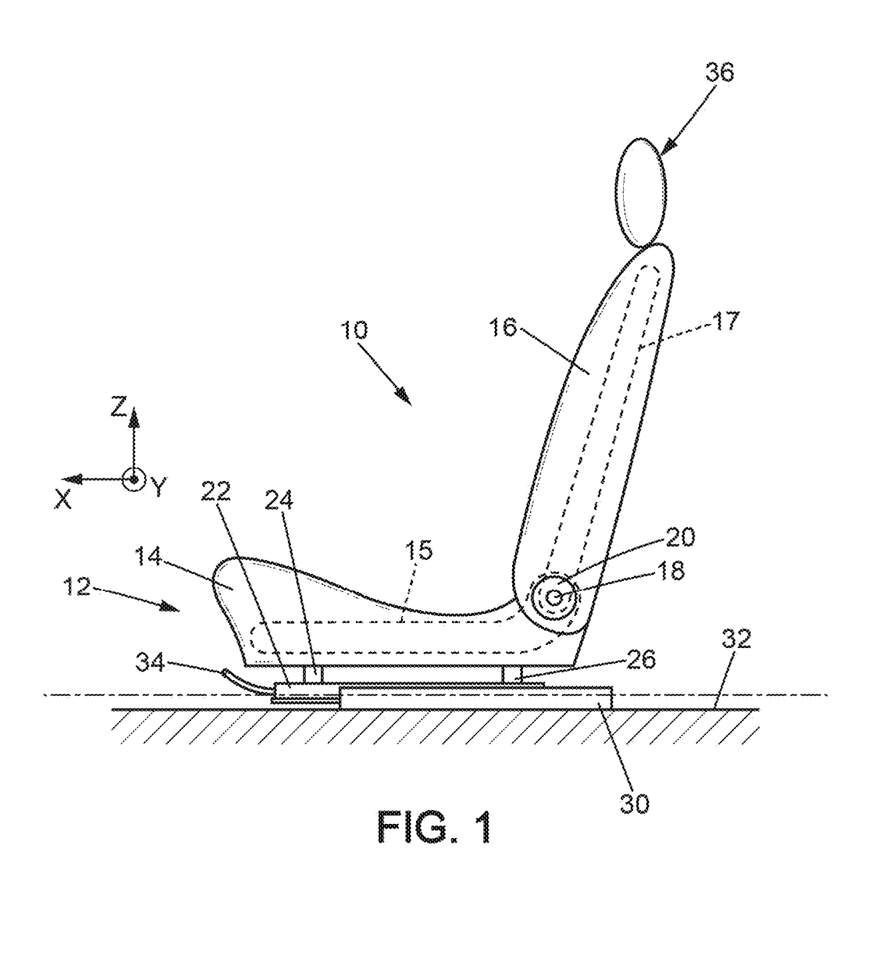
FIG. 1 schematically illustrates an example of a vehicle seat, viewed from the side.

FIG. 1 schematically shows a motor vehicle seat 10 mounted on a slide mechanism 12.

The seat 10 comprises a seating portion 14, with a seating portion frame 15, on which is mounted a backrest 16, with a backrest frame 17. Here, the backrest frame 17 pivots about a transverse axis 18, relative to the seating portion frame 15. To do this, a hinge mechanism 20 is arranged between the seating portion frame 15 and the backrest frame 17.

The seating portion 14 is mounted on movable profiles 22, also called sliders or male profiles, by means of feet or crossmembers 24, 26. Each movable profile 22 is part of a slide 12 and is associated with a fixed profile 30. The fixed profile 30 is also called a rail or female profile. The fixed profile 30 is fixed to the floor 32 of a motor vehicle.

In this example, the seat 10 comprises a manual control element 34, called a release lever, for controlling the sliding of the slides 12. This manual control element 34 makes it possible in particular to lock and unlock the systems for stopping the sliding of the movable profiles relative to the respective fixed profiles. Once the stop systems have been released, the manual control element 34 can also be used to slide the movable profiles 22 relative to their respective fixed profiles 30 of the slide 12 in the longitudinal direction X of the slides 12. The fixed 30 and movable 22 profiles of the slides 12 are generally made of metal.

Alternatively, the movement of the movable profiles 22 relative to the fixed profiles is controlled by means of an actuator.

The seat 10 may also comprise a headrest 36.

In the following, the seating portion 14 of the vehicle seat is described in more detail.

Figure 2:
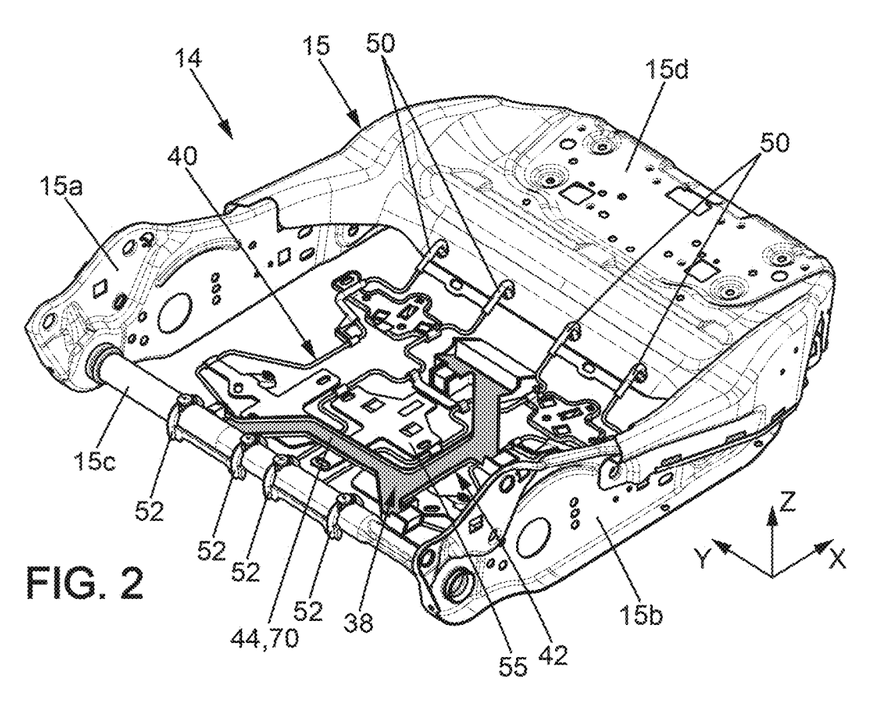
FIG. 2 schematically represents a perspective view of details of the seating portion of the vehicle seat of FIG. 1, from which the padding of the seating portion and the covering of the seating portion have been removed.

As illustrated in FIG. 2, in addition to the seating portion frame 15, the seating portion 14 comprises a suspension mat 38. The seating portion frame 15 ensures the rigidity of the seating portion 14 of the seat. Here, the seating portion frame 15 essentially comprises two longitudinal members 15a, 15b, and two crossmembers 15c, 15d fixed to the longitudinal members 15a, 15b. The seating portion frame 15 is for example made of metal.

The suspension mat 38 partly ensures the comfort of the occupant of the seat 10. Here, the suspension mat 38 is fixed to two crossmembers 15c, 15d, so that the suspension mat 38 extends essentially between the two crossmembers 15a, 15b on the one hand, and between the two cross members 15c, 15d on the other hand. The suspension mat 38 is thus suspended from the seating portion frame 15.

To further improve the comfort of an occupant of the seat 10, the suspension mat 38 may be covered with padding (not shown). The padding is for example made of foam. Finally, a cover (not shown) can cover the padding of the seating portion. The cover may be common to the seating portion 14 and to the backrest 16 of the seat 10. The cover makes it possible to hold the padding of the seating portion in position. In addition, the cover ensures the aesthetics of the vehicle seat 10.

Figure 3:
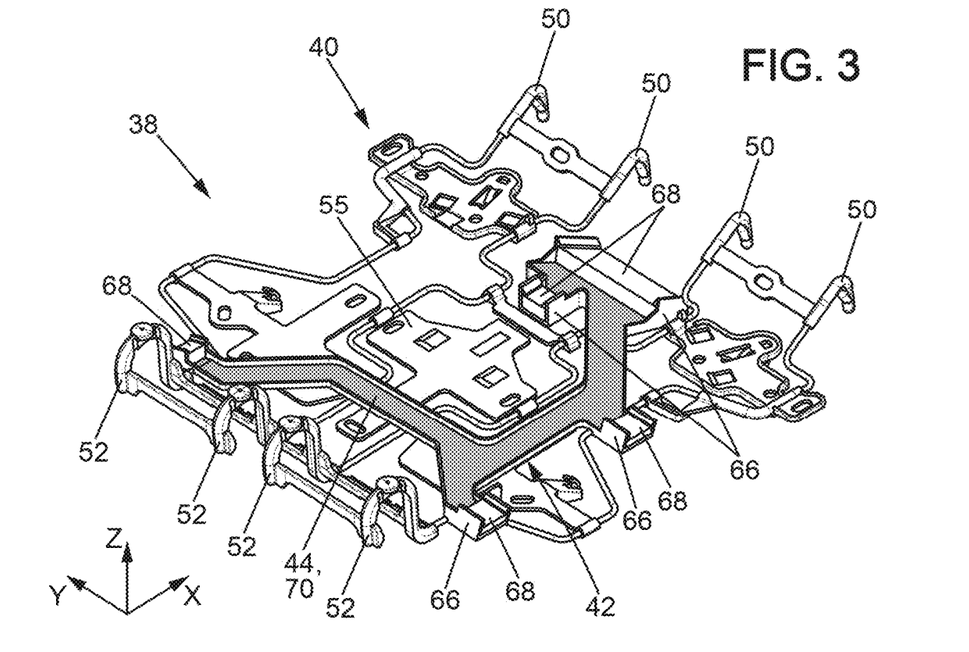
FIG. 3 represents a perspective view of a first example of a suspension mat that can be used in the seating portion of FIG. 2.
Figure 4:
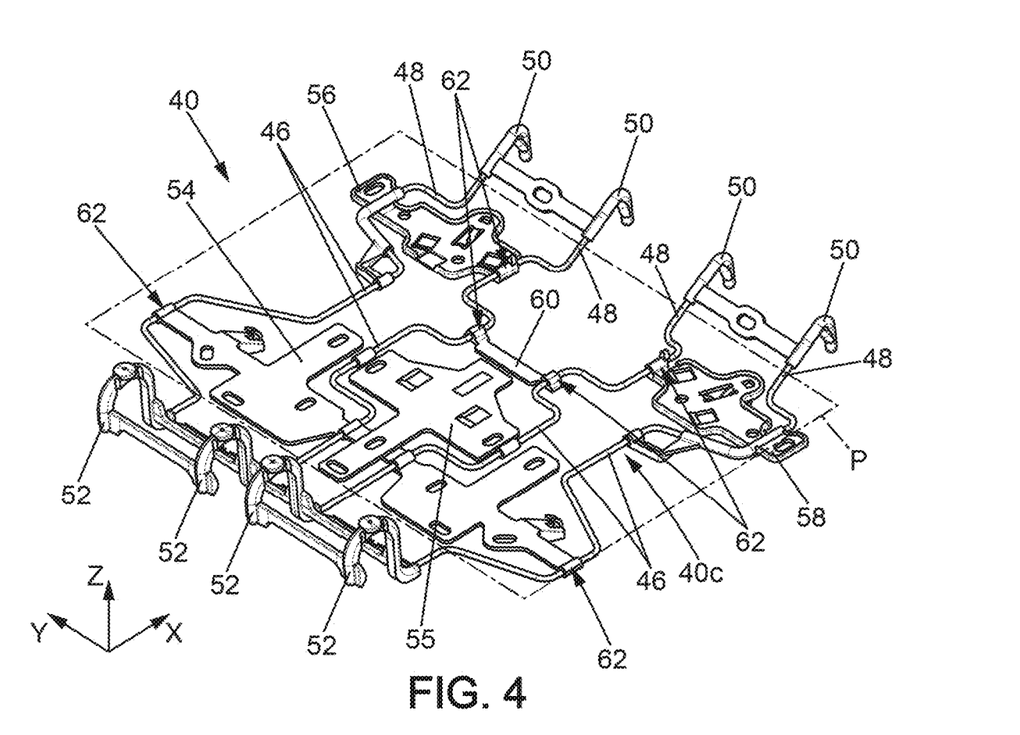
FIG. 4 represents a perspective view of the spring element of the suspension mat of FIG. 3.
Figure 5:
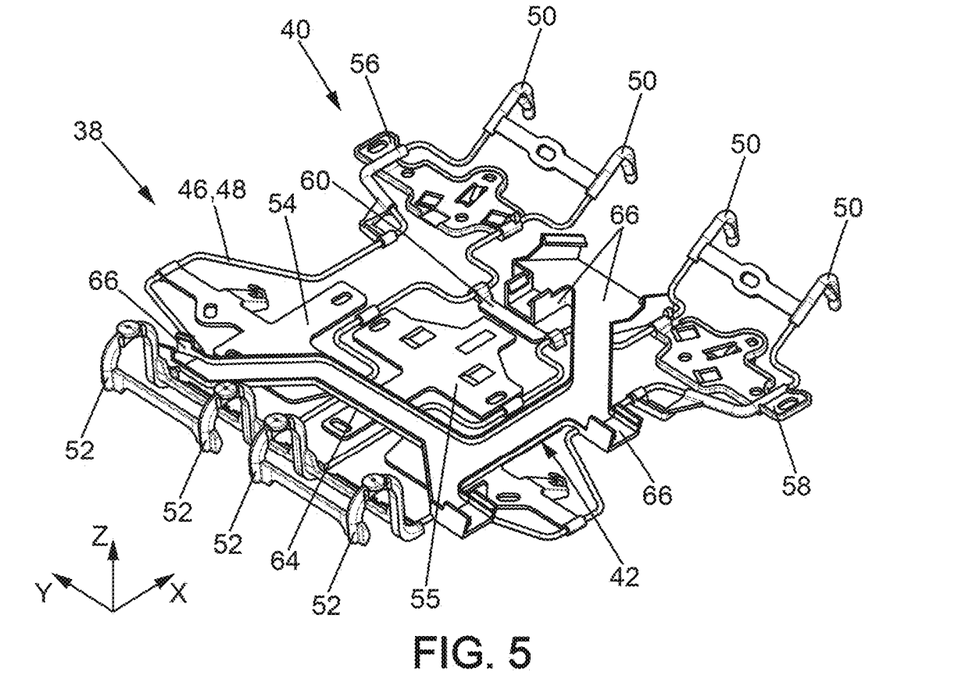
FIG. 5 represents a perspective view of the suspension mat of FIG. 3, from which all the electrical cables have been removed.

FIGS. 3 to 5 illustrate a first example of a suspension mat 38 that can be implemented in the seating portion 14 illustrated in FIG. 2. As can be seen in FIGS. 3 and 5, the suspension mat 38 essentially comprises a spring element 40 and a guiding support 42 for electrical cables 44. Here, the guiding support 42 is molded onto the spring element 40.

As is particularly visible in FIG. 4, the spring element 40 firstly comprises a plurality of springs 46. Here, each spring 46 comprises a metal wire 48. As can be seen in FIG. 4 in particular, the central portions of the metal wires 48 here define a plane P, hereinafter referred to as the plane P of the central portion 40c of the spring element 40. In other words, with the exception of the portions near their ends, the metal wires 48 extend in a plane P. Here, each metal wire 48 extends in a serpentine manner in the central portion 40c of the spring element 40. Each metal wire 48 thus has a plurality of curves in its central portion. The curves of the metal wires 48 are coplanar here.

Furthermore, the ends of the metal wires 48 are bent so as to extend outside the plane P of the central portion 40c of the spring element 40. Here, attachment hooks 50, 52 are molded onto the ends of each metal wire 48. The hooks 50, 52 are for example made of plastic. As can be seen in FIG. 4 in particular, the hooks 50, 52 may or may not be interconnected, in particular in pairs. The hooks 50, 52 allow attachment to the crossmembers 15c, 15d, as is particularly visible in FIG. 2. The hooks 52 may in particular be clipped onto a crossmember 15c. The hooks 50 may be received in openings provided for this purpose in a crossmember 15d. The type of attachment of the hooks 50, 52 to one end of the suspension mat 38 may be different from the type of attachment of the hooks 52, 50 to the other end of the suspension mat 38, as illustrated in FIG. 2. The hooks 50, 52 thus make it possible to suspend the suspension mat 38 from the seating portion frame 15.

In addition, as can be seen in particular in FIG. 4, the spring element 40 also comprises retaining elements 54, 56, 58, 60. Here, the retaining elements 54, 56, 58, 60 hold the springs 46 in position relative to one another. The retaining elements 54, 56, 58, 60 are for example made of plastic. Advantageously, the retaining elements 54, 56, 58, 60 are molded onto the metal wires 48 at the same time as the hooks 50, 52. Here, the retaining elements 54, 56, 58, 60 are in the form of plates forming housings 62 each receiving a metal wire 48. For example, each retaining element 54, 56, 58, 60 comprises two housings 62 each receiving a respective metal wire 48, to make it possible to hold the two metal wires 48 in their relative position. Each housing 62 is for example cylindrical, the cylindrical wall of the housing 62 surrounding all or part of the metal wire 48 which is received therein.

A first retaining element 54 here connects all the metal wires 48 together. Here, the first retaining element 54 extends near one end of the suspension mat 38, in particular near the back end of the suspension mat 38. Each of the other retaining elements 56, 58, 60 connects two neighboring metal wires 48 together. Two other retaining elements 56, 58 are near the end of the suspension mat 38 that is opposite to the end to which the first retaining element 54 is near. The last retaining element 60 is arranged near the center of the central portion 40c of the spring element 40.

In addition, the suspension mat 38 here comprises a presence sensor 55. The presence sensor 55 here is also substantially planar in form. The presence sensor 55 here forms a plate with housings each receiving a metal wire 48. The presence sensor 55 thus also contributes to maintaining the relative positions of the metal wires 48 to which it is fixed. Alternatively, the presence sensor 55 may be fixed on a plate such as the one described above.

Furthermore, as can be seen in particular in FIG. 5, the guiding support 42 is fixed on the spring element 40. Here, the guiding support 42 is molded onto the spring element 40, in particular onto retaining element 54 of the spring element 40 and/or directly onto the metal wires 48 of the spring element 40. Thus the guiding support 42 is created directly on the spring element 40. This facilitates the method for manufacturing the suspension mat 38. The guiding support 42 is for example made of plastic. In addition, the guiding support 42 is preferably one piece.

The guiding support 42 is more clearly visible in FIG. 5. As illustrated in this FIG. 5, the guiding support 42 forms a groove 64. Here, the groove 64 is suitable for receiving one or more electrical cables 44. In particular, here the groove 64 has a "U" cross-section. This shape of the groove 64 ensures good retention of the electrical cables 44 within the guiding support 42. The groove 64 thus has a bottom and two side walls extending from the bottom. The side walls extend for example perpendicularly to the bottom of the groove 64. The height of the side walls of the groove 64 is for example slightly greater than the thickness of the electrical cables 44. This ensures satisfactory retention of the electrical cables 44 in the groove 64, while limiting the space occupied by the guiding support 42. Each side wall of the groove 64 may have, at its free end, a flange oriented towards the other side wall. Retention of the electrical cables 44 in the groove 64 is thus further improved. Additionally or alternatively, clips may be provided in the groove 64, to fix the electrical cables 44 in the groove 64.

The height of the side walls of the groove 64 is preferably less than 1 cm, more preferably less than 5 mm.

In the example illustrated, the guiding support 42 has, at each end of the groove 64, a housing 66 intended to receive a connector 68 of the electrical cable(s) 44 received in the groove 64. Here, each housing 66 is suitable for enabling attachment of the connector 68 by snap-fitting. Thus, each housing 66 has a bottom and two side walls extending from the bottom, defining a space in the housing 66 that is the shape of the connector 68 to be received. In addition, the side walls of the housing 66 are elastically deformable. Finally, in the example illustrated, the free ends of the walls each have a relief protruding towards the other wall. These reliefs thus allow snap-fitting a connector 68 inserted for example through the top of the housing 66, and holding the connector 68 in position in the housing 66. At least one housing 66 can be near the edges of the spring element 40, in particular of the central portion 40c of the spring element 40. Such a housing 66 thus makes it possible to attach a connector 68 as close as possible to a connector connected to a sensor and/or to an actuator present in the seat but external to the seating portion. Additionally or alternatively, at least one housing 66 is on the central portion 40c of the spring element 40, to enable connecting a sensor or an actuator present in the seating portion 14. The housing 66 arranged near the front end of the spring element 40 may in particular receive a connector 68 enabling the connection of all sensors and/or actuators to be connected, with a ribbon cable external to the seat 10.

The shape of the groove 64, in particular its cross-section, is adapted to the shape of the electrical cable or cables 44 which are received therein. Here, the "U" cross-section of the groove 64 is particularly suitable for an electrical cable 44 comprising a ribbon cable 70. As can be seen on FIG. 3, the width of the groove 64 can be equal or slightly larger than the width of the ribbon cable 70 received in the groove 64, both viewed in cross section. In this case, "slightly larger" is to be understood as "less than 20% larger", preferably "less than 10% larger", more preferably "less than 5% larger". The height of the ribbon cable 70 is less than the height of the groove 64. The ribbon cable 70 here connects the electrical connectors 68 which form the ends of the electrical cables 44. The ribbon cable 70 may also be flexible. Flexible is understood here to mean that the ribbon cable 70 is in particular more flexible than the guiding support 42, in particular than the groove 64 of the guiding support 42. The ribbon cable 70 may in particular be a flexible printed circuit (or "flex PCB", "flex circuit"). Such a ribbon cable 70 thus allows a large number of electrical connections while maintaining a small footprint. Such a ribbon cable 70 appears particularly well suited for connecting low-power actuators or seat sensors.

In two ribbon cables 70, it is possible to provide different conductive tracks or a different number of conductive tracks, while maintaining the same cable shape. It is thus possible to maintain the same cable shape for two vehicle seats comprising a different number of sensors and/or actuators to be connected to the ribbon cable and/or for which the sensors and/or actuators are different and/or are arranged differently. Assembly of the ribbon cable 70 at the production line for the vehicle seat can thus be facilitated.

Additionally or alternatively, the electrical cable(s) 44 comprise a single electrical wire or a plurality of electrical wires, in particular in the form of a bundle of electrical wires, preferably connecting to electrical connectors 68. In this case, the width or diameter of the groove 64 is advantageously equal or slightly larger than the diameter of the bundle of electrical wires, both viewed in cross-section. In this case, "slightly larger" is to be understood as "less than 20% larger", preferably "less than 10% larger", more preferably "less than 5% larger". The diameter of the bundle of electrical wires is less than or equal to the height or diameter of the groove 64. The electrical wire(s) are preferably encased in sheathing. Each electrical wire and/or the bundle of electrical wires can then have a circular cross-section. Such electrical wires generally allow a more powerful electric current to be transmitted than a flexible printed circuit. Such electrical wires thus seem particularly suitable for supplying electric power to more powerful actuators, such as a motor or a fan. In the case where the electrical wire or the bundle of electrical wires is of circular cross-section, a groove 64 of complementary circular cross-section is preferred.

Finally, as can be seen in particular in FIG. 4, the guiding support 42, in particular the groove 64, here preexists the receiving of the electrical cable(s) 44. In other words, the guiding support 42 is fabricated before receiving the electrical cable(s) 44. Thus, here the electrical cable(s) 44 are inserted in the guiding support 42, in particular in the groove 64. Alternatively, it is possible to provide that the guiding support 42, in particular the groove 64, is molded directly onto the electrical cables 44.

Figure 6:
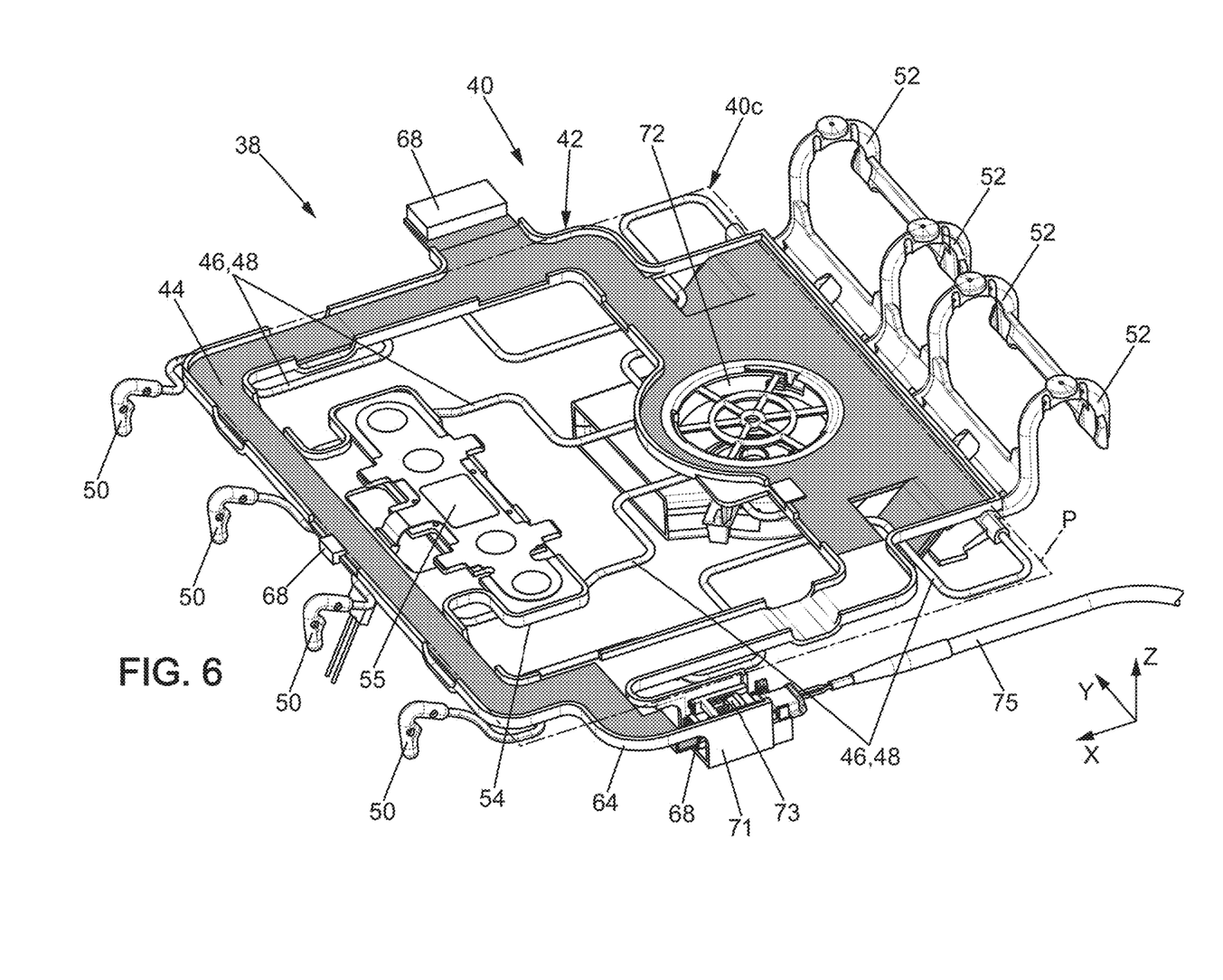
FIG. 6 is a perspective view of a second example of a suspension mat that can be implemented in the seating portion of FIG. 2.
Figure 7:
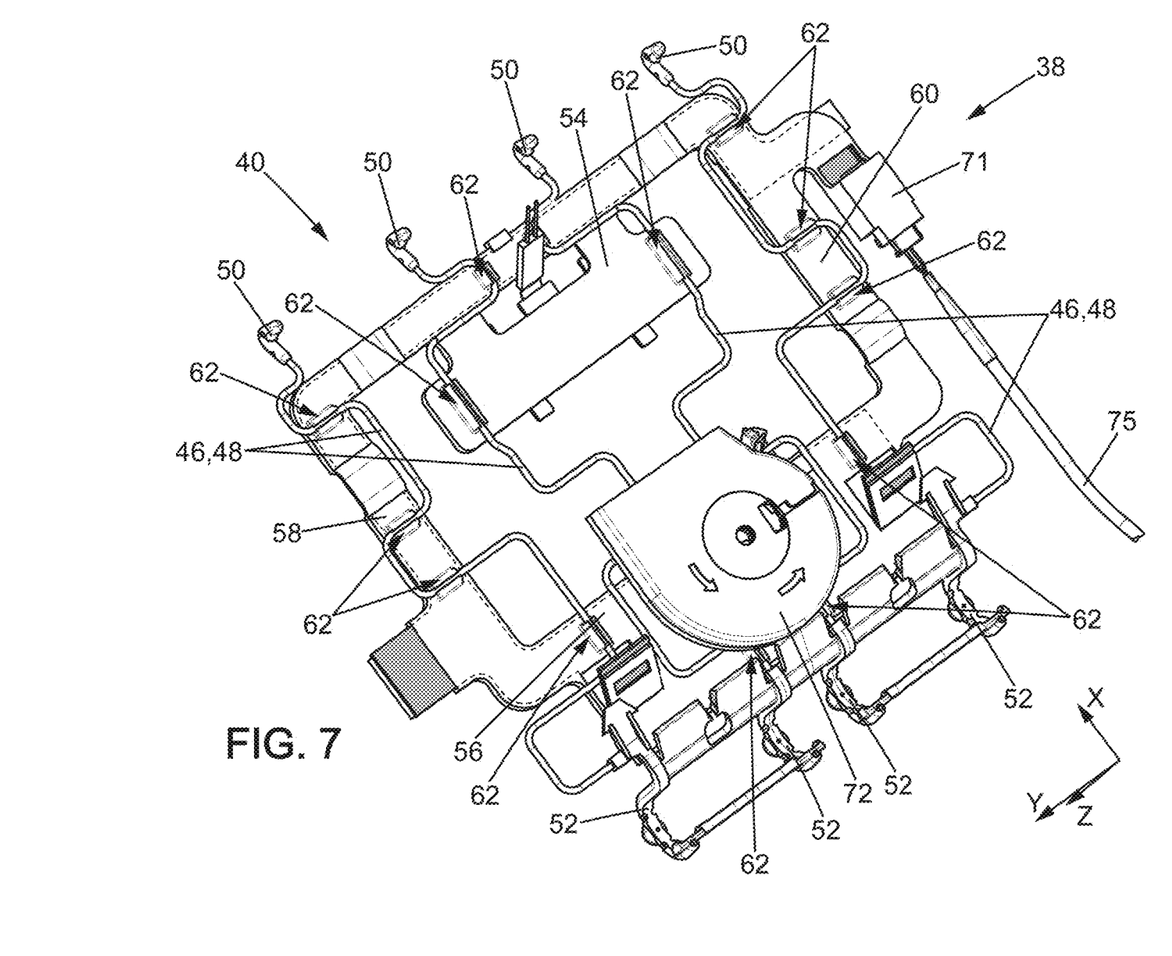
FIG. 7 is a view, from an opposite perspective, of the second example of the suspension mat of FIG. 6.

FIGS. 6 and 7 illustrate a second example of a suspension mat 38.

This second example of a suspension mat 38 differs from the first example described, essentially because the groove 64 of the guiding support 42 extends along the sides of the central portion 40c of the spring element 40. The guiding support 42 thus has a frame-like shape, which does not overlap part of the central portion 40c of the spring element 40. Thus, the influence of the guiding support 42 on the elasticity of the spring element 40 is limited, in particular on its central portion 40c, and consequently on the comfort of the occupant of the seat 10. Preferably, the guiding support 42 does not overlap the spring element 40, and over a central portion of the spring element 40, corresponding to at least 10% of the area of the central portion 40c, preferably at least 20% of the area of the central portion 40c, more preferably at least 30% of the area of the central portion 40c, even more preferably at least 40% of the area of the central portion 40c, and even more preferably at least 50% of the central portion 40c.

In addition, here, the guiding support 42 is molded onto the springs 46 of the spring element 40, at the same time as the retaining elements 54, 56, 58, 60. This allows an even easier manufacturing of the suspension mat 38. Here, the guiding support 42 is thus created integrally with the retaining elements 54, 56, 58, 60. In other words, the guiding support 42 also forms retaining elements 54, 56, 58, 60 for the wires 48 forming the springs 46 of the spring element 40. One may note here that two retaining elements 54, 56 connect separate wires 48 together, thus ensuring a relative position of these wires 48. Two other retaining elements 58, 60 form several housings 62 receiving different portions of the same wire 48. These retaining elements 58, 60 thus ensure increased rigidity of the corresponding springs 46, in particular near the edges of the central portion 40c of the spring element 40.

The guiding support 42 thus forms housings 62 each receiving a wire 48 forming a spring 46. Each housing 62 extends here on a face of the guiding support 42, opposite to the face having the groove 64 receiving the electrical cable(s) 44.

In addition, here the housings 62 have an axial slot. It is thus possible for the metal wires 48 forming the springs 46 to be removed from the housings 62 without damaging the guiding support 42.

It should also be noted that the suspension mat 38 may comprise a fan 72. Here, the fan 72 is fixed on the guiding support 42 and/or on the spring element 40. The fan 72 is also electrically powered by means of the electrical cable 44 received in the groove 64 of the guiding support 42.

In addition, here the presence sensor 55 is fixed on a base 54 forming a retaining element. Here the base 54 is created integrally with the groove 64. Alternatively, according to an embodiment not shown, the presence sensor 55 may be formed directly by the ribbon cable 70, the latter then preferably having a segment close to the center of the central portion 40c of the spring element 40.

Furthermore, the guiding support 42 here forms, on one side, a housing 71 for receiving a connector 73 of the electrical cable 75 of the seat belt buckling sensor. The electrical cable 75 here is not received in the guiding support 42. The guiding support 42 however makes it possible to ensure the position of the connector 73.

Figure 8:
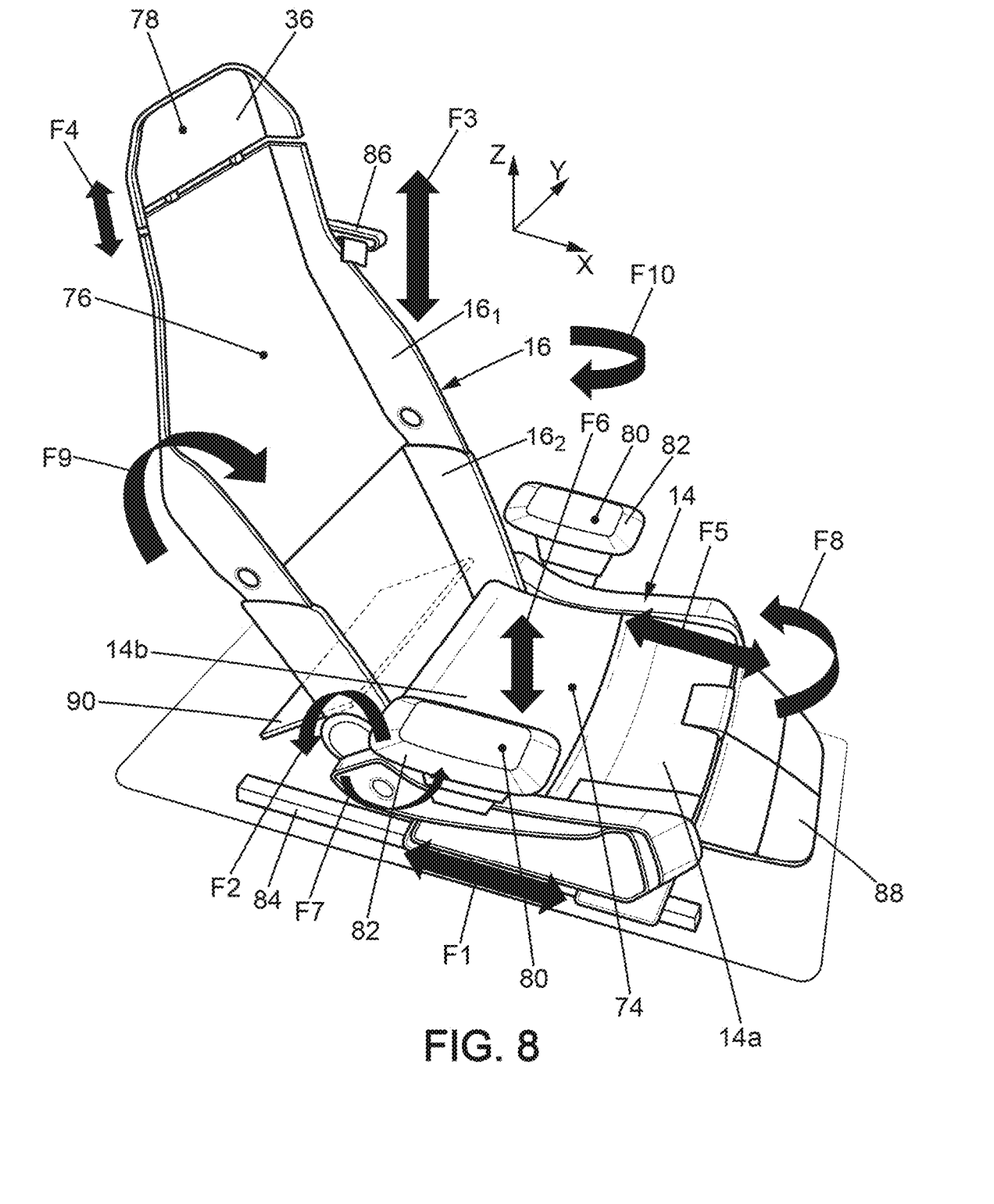
FIG. 8 schematically illustrates various sensors and actuators that can equip a motor vehicle seat.

FIG. 8 schematically illustrates examples of sensors and actuators that can equip the vehicle seat 10 and be connected to the electrical cable(s) 44 received in the guiding support 42 in order to be electrically powered and/or to be connected to an electronic control unit possibly positioned externally to the seat.

The seat 10 may in particular comprise:
at least one sensor 74 in the seating portion 14, and/or
at least one sensor 76 in the backrest 16, and/or
at least one sensor 78 in the headrest 36, and/or
at least one sensor in the seat belt buckle;
at least one sensor 80 in one of the armrests 82.

The sensors 74, 76, 78, 80 in the seating portion 14, the backrest 16, the headrest 36, and the armrests 82, respectively may in particular each be one among:
a presence sensor for detecting an occupant of the seat 10;
a temperature sensor;
a humidity sensor;
a perspiration sensor for the occupant of the seat 10;
an accelerometer;
a sensor for detecting information relating to the morphology of the occupant of the vehicle seat 10.

The sensor in the seat belt buckle may in particular be a seat belt buckling sensor.

Furthermore, the actuators equipping the seat 10 may in particular be placed in the seating portion 14, in the backrest 16, in the headrest 36, in the armrests 82, under the seating portion 14, in particular on the rails of the slide. Each actuator may in particular comprise an electric motor electrically powered via the electrical cable(s) 44 received in the guiding support 42.

The seat 10 as illustrated in FIG. 8 can thus comprise, among others:
an actuator for adjusting a longitudinal position F1 of the seat 10 on a guide rail 84;
an actuator for adjusting the tilt F2 of a backrest 16 of the seat 10 relative to the seating portion 14 or the tilt F9 of an upper backrest relative to a lower part of the backrest 16;
an actuator for adjusting the position F3 of a seat belt guide 86 of the seat belt system;
an actuator for adjusting the relative position F4 of a headrest 36 in relation to a backrest 16 of the vehicle seat, in particular a vertical position and/or a longitudinal position of the headrest 36 relative to the backrest 16;

an actuator for adjusting a longitudinal position F5 of a front part 14a of the seating portion 14 of the seat 10, in particular of a front cushion, relative to a rear part 14b of the seating portion 14 of the seat 10, in particular a rear cushion;

an actuator for adjusting the height F6 of the seating portion 14 of the seat 10;

an actuator for adjusting a tilt of the seating portion 14, for example relative to a support of the vehicle seat 10;

an actuator for adjusting the position F8 of a leg support 88 relative to the seating portion 14 of the seat 10;

an actuator for adjusting the position F7 of the or of each armrest 82 of the vehicle seat 10;

an actuator for adjusting the elongation of the or of each armrest 82 of the seat 10;

an actuator for adjusting the pivoting F10 of the seat 10 about a substantially vertical axis, within a range of 40°, preferably within a range of 30°, more preferably within a range of 20°;

an actuator for adjusting the pivoting F10 of the vehicle seat 10 about a substantially vertical axis, within a range of one rotation, preferably half a rotation;

an actuator for adjusting the position of a footrest 90 for an occupant of another vehicle seat 10;

an actuator for massaging the occupant of the vehicle seat 10;

a fan 72, in particular in the seating portion 14 and/or in a backrest 16 of the vehicle seat 10;

a heating element, in particular a resistive heater; and at least one vibrating element, in particular at least one vibrating element intended to warn an occupant of the seat in the event of a safety alert.

This disclosure is not limited to the examples described above solely as examples, but encompasses all variations conceivable to a person skilled in the art within the framework of the protection sought.

Thus, first of all, the guiding support 42 may be devoid of a housing 66 at each end of the groove 64 or at least at one end of the groove 64.

Furthermore, at least one housing 66 for receiving a connector 68 may not be created integrally with the groove 64. In other words, at least one housing 66 may not be created in the same molding step as the groove 64. Such a housing 66 may thus be molded onto the groove 64 after formation of the groove. Alternatively, such a housing 66 may be molded onto the spring element 40, before the overmolding of the groove 64. Such a housing 66 may also be inserted in the groove 64.

According to the examples presented above, the suspension mat 38 is oriented towards the upper side of the seating portion 14. However, the suspension mat 38 may also be oriented towards the underside of the seating portion 14. The guiding support 42 can then be fitted with clamps, in particular Colson™ clamps, and/or clips, to hold the electrical cables 44 in position. Such an arrangement makes it possible to reduce or even avoid degradation of the electrical cables 44 by the padding of the seating portion 14, when the padding of the seating portion deforms or moves relative to the suspension mat 38, for example when turning a corner.

For the same reason, the housings 66 receiving the connectors 68 of the electrical cables 44 may be facing downwards and/or may be created in recesses of the guiding support 42. This reduces the friction of the connectors 68 on the padding of the seating portion.

Also, according to the examples described, the guiding support 42 exists before receiving the electrical cables 44. In other words, the electrical cable(s) 44 are inserted into the guiding support 42, in particular into the groove 64. Alternatively, the guiding support 42 may be molded onto the assembly consisting of the spring element 40 and the electrical cable(s) 44.

Finally, the groove 64 of the guiding support 42 may have shapes other than those presented above. The shape of the groove 64 may depend in particular on the number of sensors and/or actuators to be connected by means of the cable(s) 44 received therein, and on the position of these sensors and/or actuators in the seat 10. The cross-section of the groove 64 may also be adapted to the shape of the cable(s) 44 received in the groove 64, particularly in order to improve retention.

A suspension mat (38) for a vehicle seat (10) comprises a spring element (40), and a guiding support (42) for at least one electrical cable (44). The guiding support (42) is molded onto the spring element (40).

A motor vehicle seat can be associated with many electrical components. A vehicle seat can thus be equipped with various sensors, such as a presence detector for detecting an occupant of the seat for example. Additionally or alternatively, a vehicle seat can be equipped with numerous actuators, such as an actuator for adjusting an angular position of a backrest relative to a seating portion of the seat for example.

Each of these electrical components must be electrically connected to an element located externally to the vehicle seat. An actuator must be connected to a power source, usually the battery or the alternator of the motor vehicle. A sensor must generally be connected to an electronic control unit, programmed to control one or more actuators according to the signal received from the sensor. Thus, many electrical cables are generally integrated in a motor vehicle seat, in particular into the seating portion of such a seat.

The seating portion of a vehicle seat comprises a seating portion frame, a suspension mat fixed to the seating portion frame, a seating padding supported by the suspension mat, and a cover covering the padding. The electrical cables may be arranged under the suspension mat and the seating padding.

However, a large number of cables represents a significant bulk in and/or under the seating portion. In addition, the placement of the various electrical cables in the seat is made more complicated when a large number of electrical cables are present.

The present disclosure facilitates the mounting of electrical cables in the seating portion of a vehicle seat.

Furthermore, a comparative suspension mat comprises a spring element and retaining elements made of plastic molded onto the springs in order to hold the springs in position relative to one another.

The invention claimed is:

1. A suspension mat for a vehicle seat, comprising:
a spring element and
a guiding support for at least one electrical cable,
wherein the guiding support is molded onto the spring element,
wherein the guiding support comprises at least one groove suitable for receiving the at least one electrical cable, and
wherein the groove has a "U" shaped cross-section.

2. The suspension mat of claim 1, wherein the at least one electrical cable is inserted in the at least one groove.

3. The suspension mat of claim 1, wherein the guiding support comprises at least one receiving housing for an electrical connector.

4. The suspension mat of claim 3, wherein the guiding support comprises at least one receiving housing for an electrical connector at one end of the at least one groove.

5. The suspension mat of claim 4, wherein a receiving housing for an electrical connector is at each end of the at least one groove.

6. The suspension mat of claim 1, wherein the guiding support comprises at least one receiving housing for an electrical connector and wherein the at least one electrical cable comprises at least one electrical connector received in the at least one receiving housing.

7. The suspension mat of claim 6, wherein the at least one electrical cable comprises at least one ribbon cable.

8. The suspension mat of claim 6, wherein the at least one electrical cable comprises at least one electrical wire.

9. The suspension mat of claim 1, wherein the guiding support extends along edges of a planar central portion of the spring element.

10. The suspension mat of claim 1, wherein the spring element comprises at least one spring, each spring being formed by a bent metal wire.

11. The suspension mat of claim 10, wherein the guiding support is created integrally with retaining elements of the at least one spring of the spring element.

12. The suspension mat of claim 10, wherein the guiding support forms at least one receiving housing for at least one spring.

13. The suspension mat of claim 12, wherein the guiding support comprises at least one groove suitable for receiving at least one electrical cable and wherein the at least one receiving housing is on a face of the guiding support, opposite the at least one groove.

14. A vehicle seat comprising a seating portion with a seating portion frame and the suspension mat according to claim 1 that is fixed to the seating portion frame.

15. The vehicle seat of claim 14, wherein the vehicle seat further comprises at least one of:
an actuator for adjusting a longitudinal position of the seat on a guide rail;
an actuator for adjusting a tilt of a backrest of the seat relative to the seating portion or of an upper backrest relative to a lower part of the backrest;
an actuator for adjusting a position of a seat belt guide of a seat belt system;
an actuator for adjusting a relative position of a headrest in relation to a backrest of the vehicle seat;
an actuator for adjusting a longitudinal position of a front part of the seating portion of the seat relative to a rear part of the seating portion of the seat;
an actuator for adjusting a height of the seating portion of the seat;
an actuator for adjusting a tilt of the seating portion relative to a support of the vehicle seat;
an actuator for adjusting a position of a leg support relative to the seating portion of the seat;
an actuator for adjusting a position of at least one armrest of the vehicle seat;
an actuator for adjusting an elongation of at least one armrest of the seat;
an actuator for adjusting a pivoting of the seat about a substantially vertical axis, within a range of 40°;
an actuator for adjusting a pivoting of the vehicle seat about a substantially vertical axis, within a range of one rotation;
an actuator for adjusting a position of a footrest for an occupant of another vehicle seat;
an actuator for massaging an occupant of the vehicle seat;
a fan in the vehicle seat;
a heating element; and
at least one vibrating element.

16. The vehicle seat of claim 15, wherein the vehicle seat further comprises at least one sensor among:
a presence sensor for detecting an occupant of the vehicle seat;
a temperature sensor;
a humidity sensor;
a perspiration sensor for an occupant of the vehicle seat;
an accelerometer;
a sensor for detecting information relating to a morphology of an occupant of the vehicle seat;
a seat belt buckling sensor;
the at least one sensor being electrically connected to the at least one electrical cable.

17. The vehicle seat of claim 15, wherein at least one actuator is electrically connected to the at least one electrical cable.

18. A method for manufacturing the suspension mat of claim 1 the method comprising steps of:
providing a spring element intended for supporting a seat cushion; and
molding the guiding support onto the spring element.

19. The method of claim 18, wherein the guiding support is created integrally with retaining elements of at least one spring of the spring element, wherein the molding step further comprises molding the retaining elements onto the at least one spring of the spring element.

* * * * *